Nov. 10, 1925.  
J. F. HOPE  
1,560,817  
WOOD DRYING APPARATUS  
Filed May 26, 1925
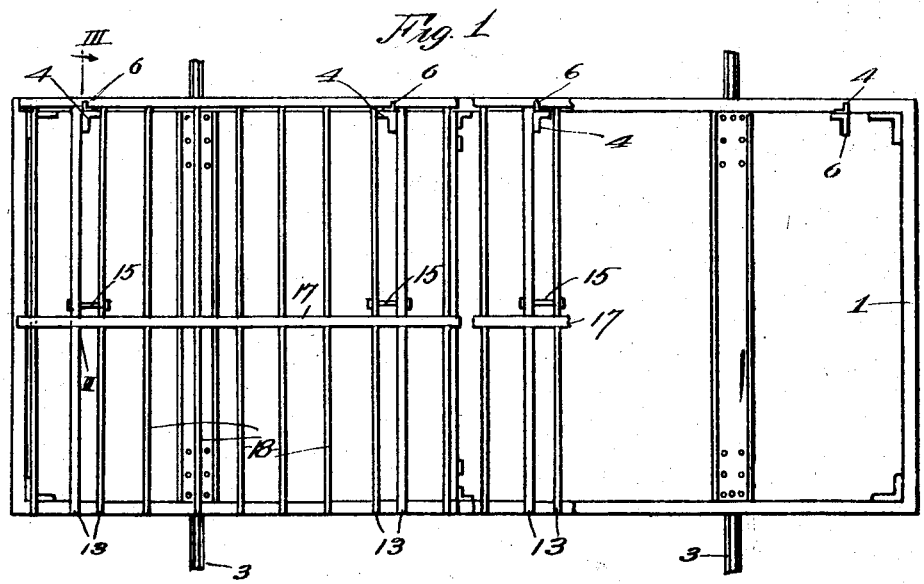
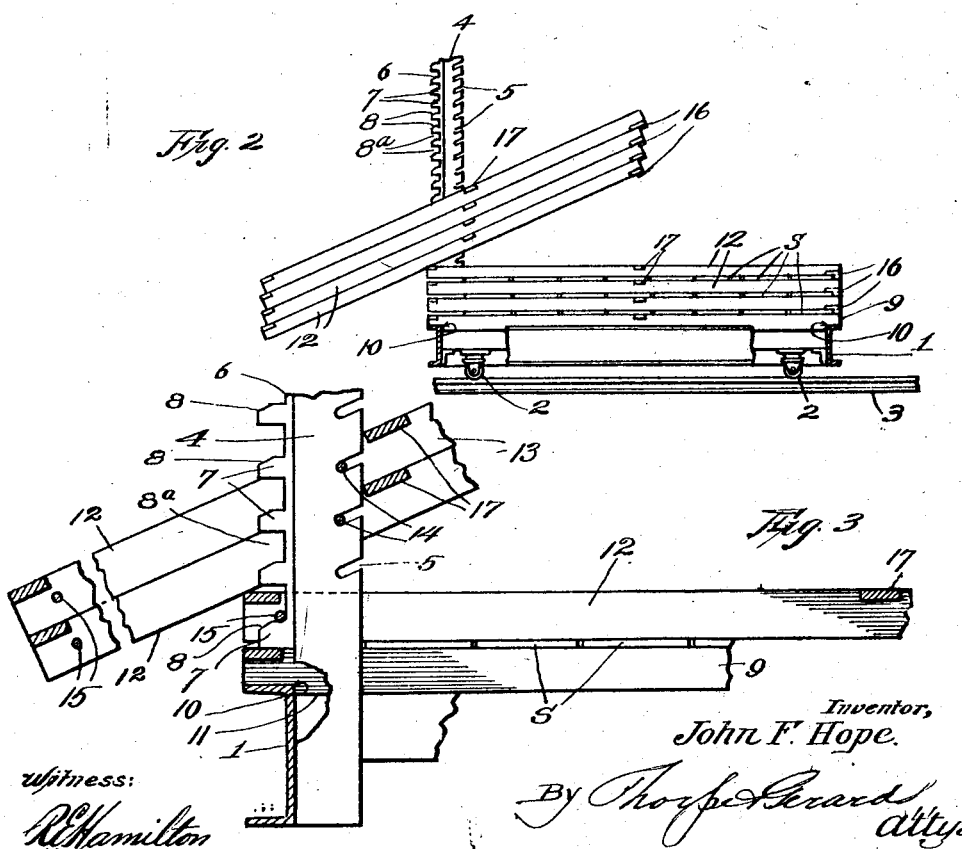
Inventor,
John F. Hope.
By Thorpe & Gerard
atty's
Witness:
R. E. Hamilton Patented Nov. 10, 1925.

1,560,817

UNITED STATES PATENT OFFICE.

JOHN F. HOPE, OF KANSAS CITY, MISSOURI.

WOOD-DRYING APPARATUS.

Application filed May 26, 1925. Serial No. 32,932.

*To all whom it may concern:*

Be it known that I, JOHN F. HOPE, a citizen of the United States, and a resident of Kansas City, county of Jackson, State of Missouri, have invented a certain new and useful Improvement in Wood-Drying Apparatus, of which the following is a complete specification.

This invention relates to wood drying apparatus of that class for use in kilns for drying veneer, boards and the like, and is designed primarily as an improvement on the drying apparatus of United States Letters Patent #1,229,470, April 8, 1919, issued to me as assignee of John T. Hope. It has been found that the structure illustrated in said patent is not wholly satisfactory as the superimposing of one or more groups of racks and material, even though the groups be small, imposes such weight upon the bottom layers of the material that the latter in drying is frequently irreparably injured through splitting. It has also been found that in such apparatus, the spacing of small groups of the rack bars from adjacent groups, by means of pins fitted through holes in standards, results in a considerable waste of time, and that even though the rack bars are arranged in small groups and spaced apart by the pins adjacent the standards, the weight of all the groups, at the opposite ends of the racks, is imposed on the undermost layer of material, as the groups of racks are free to operate pivotally on the said pins, it being noted also that because the groups are definitely spaced apart adjacent the standards and not at their opposite ends, the material is not subjected to uniform pressure by the superposed layers of material and racks, as desirable.

My object is to provide a construction wherein the racks for spacing the layers of material apart, shall be supported at both sides of the layers and independently thereof so that each layer shall sustain no more weight than that of the rack next above, and not even the weight of that if the material is perfectly flat, and its thickness is equal to the spaces between the underlying and overlying racks, and in any event shall be subjected to a substantially uniform pressure which is not sufficient to prevent warped material flattening out without splitting, as occurs frequently where the weight sustained is excessive, A further object is to provide for automatically effecting uniform spacing between the racks, and where the racks are relatively large and cumbersome, that is where they are in the form of rectangular gratings, making provision whereby one man can easily handle them with celerity in both the loading of green and the unloading of cured material.

With these objects in view, the invention consists in certain novel and useful features of construction and combinations of parts as hereinafter described and claimed; and in order that it may be fully understood reference is to be had to accompanying drawing, in which:—

Figure 1 is a top plan view of apparatus embodying the invention, the figure comprising a truck and a pair of racks supported in horizontal position thereon, one of the racks being in fragmentary form.

Figure 2 is an end elevation, partly broken away, and showing certain racks in horizontal or operative position and others in tilted or inoperative position.

Figure 3 is an enlarged fragmentary cross section on the line III—III of Figure 1.

In the said drawing, 1 indicates a truck of rectangular form, mounted on wheels 2 engaging tracks 3 leading to and from a drying kiln, not shown. The truck is preferably of skeleton construction of requisite strength but of minimum weight.

The truck is provided at what may be termed its rear side with two or more stiff vertical standards 4, having in their front edges vertical series of downwardly and rearwardly inclined equi-spaced notches 5, corresponding notches of the standards being in the same horizontal planes. Rigid with the said standards and facing rearwardly are flanges 6 provided with vertical series of teeth 7 spaced apart correspondingly with notches 5, and in substantially the same horizontal planes, upper rear corners of the teeth being cut away at 8, to form lower guide-ways to the rearwardly-opening notches 8ª between such teeth.

A series of racks is provided for use with and of area to cover the truck or as much thereof as shall be necessary to include at least an adjacent pair of standards, as shown for example by Figure 1. The racks are of skeleton rectangular form and all are of identical construction except the base or bottom one 9, which rests flatly upon the truck, and is recessed at 10, in its front and rear ends, to provide depending portions 11 to bear against the front and rear walls of the truck and thus prevent edgewise movement or shifting of such rack as the material to be dried is shoved or placed upon it or as its rear edge is utilized as a fulcrum in the manipulation of the undermost of the shiftable racks 12, it being noted that all of the racks, have pairs of cross bars 13 fitting at opposite sides of the standards, which inhibit shifting movement toward either side of the truck. Each shiftable rack 12 has two pins 14 and 15 respectively, bridging the space between its bars 13 a little forward of the middle of the rack and near the rear side thereof, the pins being at opposite sides of the standards so that pins 14 may engage notches 5 and pins 15 the teeth 7. When pins 14 engage notches 5 the corresponding rack is in tilted or inoperative position. When the pins 15 rest upon teeth 7 and the rack is fully lowered on said pins as a pivotal point, the depending lugs 16 on the front wall of the rack, rest upon the underlying horizontal rack, each rack occupies a horizontal position because the relative position of the supporting teeth 7 and the depth of the lugs 16 is such as to provide this result and thereby insure a uniform spacing between adjacent racks, which spacing is that suitable to accommodate the thickness of the material most commonly dried by the apparatus, and which is liable to injury in drying if required to sustain excessive weight. If heavy material is dried, the shiftable racks may be set two or more notches apart; or the racks may be drawn back enough to disengage their pins 15 from the notches 8ª and thus be permitted to rest solely upon the material, without endangering the latter from the cause mentioned.

Each rack is preferably stiffened by a central cross bar 17 inset with respect to the side bars and the intermediate bars 18 paralleling the side bars, and likewise inset in the front and rear bars, the result being the upper surface of the rack has no projections to interfere with proper horizontal and therefore stable stacking. This being true, the spacing between the racks is uniform and thereby properly accommodates stock or material S of uniform thickness. The length of the stock is unimportant provided it does not project beyond the sides of the truck, as in such case the projecting ends would have no direct support.

In practice raw stock is placed in a single layer on the bottom rack, the shiftable racks 12 at such time being disposed in the tilted position mentioned. The undermost of such racks is then drawn forward until its pins 15 engage the lowest notches 8ª and it is then pivotally lowered until it rests horizontally on the stock with its pins 15 upon teeth 7 and its lugs 16 resting on the bottom rack. A layer of the stock is then placed on the horizontal rack 12 and another of such racks is manipulated as explained, the alternate placing of the stock on one rack and the lowering of the next rack being continued until the supply of stock is exhausted or the truck is loaded to the desired degree. The truck is then moved on the tracks into a suitable kiln and after the stock is cured, the truck is moved out, and the loading operation described is reversed, that is the shiftable racks beginning with the topmost, are slid back until the pins 14 engage the respective notches 5 and the rack is supported in tilted position, by bearing upon the rear end of the underlying horizontal rack or part, the layers of cured stock being removed as successively exposed by the adjustment of the overlying racks to tilted or inoperative position.

From the above description, it will be apparent that I have produced apparatus embodying the features of advantage set forth as desirable in the statement of the object of the invention, and which is susceptible of some modification within the spirit and scope of the appended claims.

I claim:

1. The combination of a movable support, a set of standards rising from the rear part of the support and provided at their rear edges with spaced notches, and a series of superposed rectangular skeleton racks upon the movable support, each rack having parallel bars fitting at opposite sides of the standards, and its rear side fitting in horizontally alined notches of the standards.

2. The combination of a movable support, a set of standards rising from the rear part of the support and provided at their rear edges with spaced notches, and a series of superposed rectangular skeleton racks upon the movable support, each rack having parallel bars fitting at opposite sides of the standards, and its rear side adapted to fit in horizontally alined notches of the standards, and being slidable upwardly and back-and-forth on the standards and tiltable downwardly and rearwardly when slid back, to rest upon the underlying rack.

3. The combination of a movable support, a set of standards rising from the rear part of the support and provided at their rear edges with spaced notches, and a series of superposed rectangular skeleton racks upon the movable support, each rack having parallel bars fitting at opposite sides of the standards, and its rear side adapted to fit in horizontally alined notches of the standards, and being slidable upwardly and back-and-forth on the standards and tiltable downwardly and rearwardly when slid back, to rest upon the underlying rack, and having means to engage the standards pivotally as a fulcrum for the tilting and a limit for the rearward movement of the rack.

4. The combination of a movable support, a set of standards rising from the rear part of the support and provided at their rear edges with spaced notches, and a series of superposed rectangular skeleton racks upon the movable support, each rack having parallel bars fitting at opposite sides of the standards, and its rear side adapted to fit in horizontally alined notches of the standards and being slidable upwardly and back-and-forth on the standards and tiltable downwardly and rearwardly when slid back, to rest upon the underlying rack; the front edges of the standards having downwardly and rearwardly sloping notches, and the rack having cross pins to engage corresponding notches to limit the rearward and serve as a pivot for the tilting movement of the rack.

5. The combination of a movable support, a set of standards at the rear end of the support, and a series of superposed racks carried by the support and slidable back-and-forth and tiltable on the standards, and cooperating means on the racks at the rear and front ends thereof, for respective engagement with the standards and support to hold the racks spaced uniformly apart when in horizontal position.

6. The combination of a movable support, a set of standards rising from the rear part of the support and provided at their rear edges with spaced teeth, and a series of superposed racks carried by the support and slidable back-and-forth and tiltable upon the standards, and having cross pins for resting upon respective teeth of the standards and depending lugs for engaging the upper sides of respectively underlying racks, for the support of the racks horizontally and uniformly spaced.

7. The combination of a movable rectangular support, a series of standards rising from the rear part of the support, a rack fitting over the standards and resting horizontally on the support and having portions depending therein and engaging the front and back thereof to inhibit forward and backward shifting movement, a series of superposed racks fitting over the standards, and means for spacing the racks uniformly apart in horizontal position over the support.

In witness whereof I hereunto affix my signature.

JOHN F. HOPE.